United States Patent
Huang et al.

(10) Patent No.: US 11,476,501 B2
(45) Date of Patent: Oct. 18, 2022

(54) LITHIUM METAL ANODE PROTECTION METHOD

(71) Applicant: XIAMEN UNIVERSITY, Xiamen (CN)

(72) Inventors: Ling Huang, Xiamen (CN); Qiong Wang, Xiamen (CN); Ying Lei, Xiamen (CN); Chenguang Shi, Xiamen (CN); Shigang Sun, Xiamen (CN)

(73) Assignee: XIAMEN UNIVERSITY, Xiamen (CN)

( * ) Notice: Subject to any disclaimer, the term of this patent is extended or adjusted under 35 U.S.C. 154(b) by 78 days.

(21) Appl. No.: 17/105,517

(22) Filed: Nov. 26, 2020

(65) Prior Publication Data

US 2022/0021027 A1    Jan. 20, 2022

(30) Foreign Application Priority Data

Jul. 20, 2020  (CN) .......................... 202010701267.9

(51) Int. Cl.

| | |
|---|---|
| *H01M 4/04* | (2006.01) |
| *H01M 10/0567* | (2010.01) |
| *H01M 4/134* | (2010.01) |
| *H01M 4/136* | (2010.01) |
| *H01M 4/66* | (2006.01) |
| *H01M 10/0525* | (2010.01) |
| *H01M 10/0568* | (2010.01) |
| *H01M 10/0569* | (2010.01) |
| *H01M 4/02* | (2006.01) |

(52) U.S. Cl.
CPC ..... *H01M 10/0567* (2013.01); *H01M 4/0402* (2013.01); *H01M 4/134* (2013.01); *H01M 4/136* (2013.01); *H01M 4/663* (2013.01); *H01M 10/0525* (2013.01); *H01M 10/0568* (2013.01); *H01M 10/0569* (2013.01); *H01M 2004/027* (2013.01); *H01M 2004/028* (2013.01)

(58) Field of Classification Search
CPC ..................................................... H01M 6/168
See application file for complete search history.

(56) References Cited

U.S. PATENT DOCUMENTS

| | | | |
|---|---|---|---|
| 2018/0254520 A1* | 9/2018 | Maeda ................ | H01M 10/052 |
| 2018/0269483 A1* | 9/2018 | Cho ..................... | H01M 4/483 |
| 2020/0099090 A1* | 3/2020 | Li ....................... | H01M 10/0568 |

* cited by examiner

*Primary Examiner* — Austin Murata

(57) ABSTRACT

The invention discloses a lithium metal anode protection method improving lithium utilization efficiency, and relates to the field of lithium batteries. In a lithium battery, lithium metal is deposited on a current collector as a battery anode, and a high molecular polymer is added as an additive to an ester electrolyte. In the present application, the high molecular polymer is prepared by a polymerization reaction of monomer A being acrylonitrile or derivatives thereof, monomer B being perfluoroalkyl ethyl methacrylate or derivatives thereof, and monomer C being alkyl alcohol diacrylate or derivatives thereof. Due to the negative charge on the surface of lithium metal, the —CN and —$CF_3$ in the polymer are strong electron-withdrawing groups, which promote the preferential adsorption of electrolyte additives on the surface of lithium metal and reduce the contact of other components in the electrolyte with lithium metal.

9 Claims, 4 Drawing Sheets

LITHIUM METAL ANODE PROTECTION METHOD

TECHNICAL FIELD

The invention relates to the field of lithium batteries, and in particular, to a lithium metal anode protection method improving lithium utilization efficiency.

BACKGROUND

In the process of the recycling of the lithium metal anode, there are problems such as unevenness of lithium deposition and dissolution, and high side reaction activity between electrolyte and lithium metal, which result to the growth of lithium dendrites, low coulombic efficiency and low cycle capacity retention of lithium batteries, etc.

SUMMARY

The purpose of the present invention is to reduce the contact of components other than lithium ions in the lithium battery electrolyte with the lithium metal anode, so as to avoid the occurrence of continuous side reactions, and to make the lithium deposition smaller and more uniform. Thereby to slow down the formation of lithium dendrites and achieve a high lithium utilization efficiency of the lithium metal anode. Wherein the high lithium utilization efficiency refers to the improvement of coulombic efficiency and full battery performance. And further includes the use of a very small amount of lithium to complete the long-term stable cycle of the battery, with a high cycle capacity retention rate of the lithium battery. To achieve the forgoing objective, the present invention adopts the following technical solutions.

The present invention provides a lithium metal anode protection method improving lithium utilization efficiency. The lithium metal anode protection method comprises steps of depositing lithium metal on a current collector as an anode of the lithium battery and adding a high molecular polymer configured as an additive to an ester electrolyte.

The high molecular polymer being prepared by a polymerization reaction of monomer A being acrylonitrile or derivatives thereof, monomer B being perfluoroalkyl ethyl methacrylate or derivatives thereof, and monomer C being alkyl alcohol diacrylate or derivatives thereof.

Because the surface of lithium metal is negatively charged, the —CN and —$CF_3$ in the polymer are strong electron-withdrawing groups, which promote the preferential adsorption of electrolyte additives on the surface of lithium metal. At the same time, the battery with carbon paper as the cathode, and lithium sheet as the anode is tested by CV (cyclic voltammetry) method with an open circuit voltage test at a scan rate of 50 mV/s. The half-cell with electrolyte additives does not produce a new signal peak for the decomposition of electrolyte components. It is proved that the high molecular polymer will not decompose in the battery test environment and will not participate in the electrochemical reaction. The adsorption effect of electrolyte additives can reduce the contact of other components in the electrolyte with lithium metal, thereby avoiding the occurrence of continuous side reactions.

Lithium metal is very active, and it will react with electrolyte to form SEI film, which will consume a large amount of active lithium and electrolyte. This is also one of the factors that cause the long-term stable operation of lithium metal batteries. By adsorbing, a layer of organic molecules that will not decompose on the surface of lithium metal, the contact between lithium salt and solvent molecules in the electrolyte can be reduced, and the probability of decomposition can be reduced. At the same time, the polymer molecules are capable of conducting lithium ions, thus will not have a great impact on the transmission of lithium ions. Therefore improves the Coulomb efficiency.

Through the CV test, it is known that when the polymer is added as an electrolyte additive, the potential of lithium overpotential deposition negative shifts, indicating that the electrolyte additive has a blocking effect on lithium deposition. And the overpotential of lithium deposition is inversely proportional to the size of lithium nuclei. Therefore, the addition of electrolyte additives makes lithium deposition smaller and more uniform, thereby slowing the formation of lithium dendrites.

Preferably, the current collector is carbon paper. Carbon paper is more beneficial to the improvement of the coulombic efficiency of the lithium metal anode. By depositing a small amount of lithium on the surface of the current collector as the anode of the lithium battery, the safety performance of the battery can be improved while improving the lithium utilization efficiency.

Preferably, the cathode of the lithium battery is lithium iron phosphate.

Preferably, an addition amount of the high molecular polymer is 2 wt % of that of the ester electrolyte. The addition of electrolyte additives with a mass fraction of 2% is more conducive to the improvement of coulombic efficiency and the long-term stable cycle of the battery.

Preferably, the ester electrolyte is a 0.8~1.2 mol/L $LiPF_6$ solution, wherein the solvent is selected from ethylene carbonate, ethyl methyl carbonate and dimethyl carbonate, and the $LiPF_6$ solution contains fluoroethylene carbonate with a mass ratio of 3 to 7%.

Preferably, the step of preparing the high molecular polymer from monomer A, monomer B and monomer C through polymerization reaction includes: under the protection of inert gas, dispersing monomer A, monomer B, and monomer C in water with a molar ratio of 1:1:0.01-2; heating to 50-80° C. and stirring for 5-15 minutes; and then adding an initiator potassium persulfate; performing the polymerization reaction at 50-80° C. for 5-24 hours to obtain a polymerization solution; wherein a mass ratio of the initiator potassium persulfate to the monomer C is 0.01-0.2:1; drying the polymerization solution to obtain the high molecular polymer.

Preferably, the monomer B is selected from perfluoroalkylethyl methacrylate, (meth)acrylic acid fluorine-containing alkyl ester, (meth)acrylic acid heteroatom-containing perfluoroalkyl ester, (meth) acrylic acid perfluoroamide and (meth) perfluorosulfonamide acrylate.

Preferably, the monomer C is selected from diethylene glycol diacrylate, 1,4-butanediol diacrylate, 1,6-hexanediol diacrylate, tripropylene glycol diacrylate, and neopentyl glycol diacrylate.

Preferably, the step of depositing the lithium metal on the current collector of the lithium battery as the anode of the lithium battery comprises assembling a half-cell where a cathode of the half-cell is a current collector and an anode of the half-cell is a lithium sheet; depositing a predetermined amount of lithium metal on the current collector under a predetermined current density in a predetermined time; and disassembling the current collector deposited with the lithium metal from the half-cell to act as the anode of the lithium battery; wherein an amount of the lithium metal deposited on the current collector is 0.1~5 $mAh/cm^2$.

Beneficial effects of the present invention lie in that, the contact of components other than lithium ions in the lithium battery electrolyte with the lithium metal anode are reduced, thereby avoiding the occurrence of continuous side reactions, and making the lithium deposition smaller and more uniform, so as to slow down the formation of lithium dendrites, and achieve high lithium utilization efficiency of lithium metal anodes. Wherein high lithium utilization efficiency refers to the improvement of coulombic efficiency and full battery performance. Further includes the use of a very small amount of lithium to complete the long-term stable cycle of the battery, and the lithium battery has a high cycle capacity retention rate.

DESCRIPTION OF EMBODIMENTS

Figure 1:
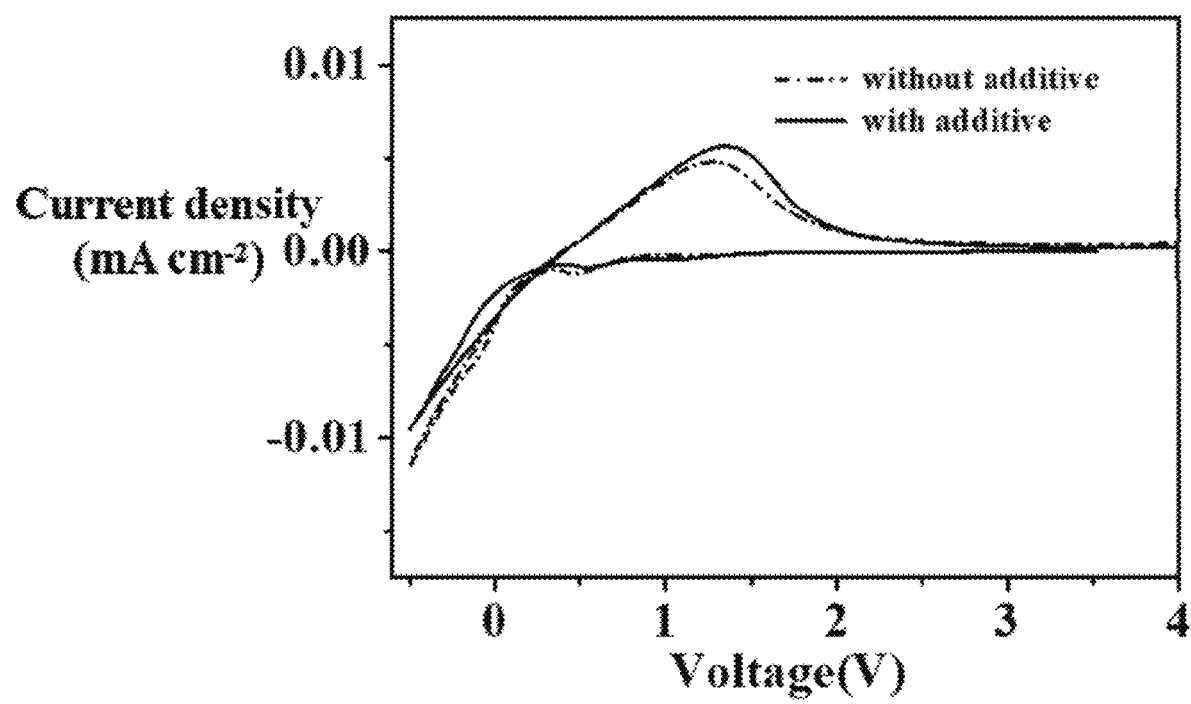
FIG. 1 shows the CV test curve of lithium batteries with and without electrolyte additives.

To make the objectives, technical solutions, and advantages of the embodiments of the present invention clearer, the technical solutions of the embodiments of the present invention will be described clearly and completely in conjunction with the accompanying drawings. If specific conditions are not indicated in the embodiments, it shall be carried out in accordance with conventional conditions or conditions recommended by the manufacturer. The reagents or instruments used without the manufacturer's indication are all conventional products that can be purchased commercially.

Embodiment 1

This embodiment provides a lithium metal anode protection method that improves lithium utilization efficiency. In a lithium battery using the current collector with lithium metal deposited thereon as the anode of the lithium battery, wherein the current collector is carbon paper, and the amount of the lithium metal deposited on the current collector is 0.6 mAh/cm$^2$; using the lithium iron phosphate as the battery cathode; the high molecular polymer is added into the ester electrolyte as an additive, and the addition amount of the high molecular polymer is 2 wt % of that of the ester electrolyte.

The mentioned process of depositing lithium metal on the current collector includes the following steps: first assembling a half-cell with the cathode being the carbon paper and the anode being a lithium sheet; and depositing a predetermined amount of lithium metal on the carbon paper under a predetermined current density in a predetermined time; and then disassembling the current collector with the deposited lithium to act as the anode of the lithium battery.

The mentioned ester electrolyte is a 1 mol/L LiPF$_6$ solution, the solvent thereof is ethylene carbonate (EC), and the LiPF$_6$ solution also contains 5% fluoroethylene carbonate (FEC) by mass.

The above-mentioned high molecular polymer is prepared by polymerization reaction of monomer A being acrylonitrile, monomer B being perfluoroalkyl ethyl methacrylate and monomer C being diethylene glycol diacrylate. The polymerization reaction step includes: under the protection of inert gas, dispersing monomer A, monomer B, and monomer C in water with a molar ratio of 1:1:1, heating to 65° C. and stirring for 10 minutes, and then adding the initiator potassium persulfate (KPS), performing the polymerization reaction at 65° C. for 15 hours to obtain a polymerization solution; wherein the mass ratio of the initiator potassium persulfate (KPS) to the monomer C is 0.1:1; drying the polymerization solution to obtain the target polymer.

Embodiment 2

This embodiment provides a lithium metal anode protection method that improves lithium utilization efficiency. In lithium batteries: using the current collector with lithium metal deposited thereon as the anode of the lithium battery, wherein the current collector is carbon paper, and the amount of the lithium metal deposited on the current collector is 0.1 mAh/cm$^2$; using the lithium iron phosphate as the battery cathode; the high molecular polymer is added into the ester electrolyte as an additive, and the addition amount of the high molecular polymer is 2 wt % of that of the ester electrolyte.

The mentioned process of depositing lithium metal on the current collector includes the following steps: first assembling a half-cell with the cathode being the carbon paper and the anode being a lithium sheet; and depositing a predetermined amount of lithium metal on the carbon paper under a predetermined current density in a predetermined time; and then disassembling the current collector with the deposited lithium to act as the anode of the lithium battery.

The mentioned ester electrolyte is a 0.8 mol/L LiPF$_6$ solution, the solvent thereof is ethyl methyl carbonate (EMC), and the LiPF$_6$ solution also contains 3% fluoroethylene carbonate (FEC) by mass.

The above-mentioned high molecular polymer is prepared by polymerization reaction of monomer A being 2-(4-arylthiazol-2-yl)acrylonitrile, monomer B being (meth)acrylic acid heteroatom-containing perfluoroalkyl ester and monomer C being 1, 4-Butanediol diacrylate. The polymerization reaction step includes: under the protection of inert gas, dispersing monomer A, monomer B, and monomer C in water with a molar ratio of 1:1:0.01, heating to 50° C. and stirring for 5 minutes, and then adding the initiator potassium persulfate (KPS), performing the polymerization reaction at 50° C. for 5 hours to obtain a polymerization solution; wherein the mass ratio of the initiator potassium persulfate (KPS) to the monomer C is 0.2:1; drying the polymerization solution to obtain the target polymer.

Embodiment 3

This embodiment provides a lithium metal anode protection method that improves lithium utilization efficiency. In lithium batteries: using the current collector with lithium metal deposited thereon as the anode of the lithium battery, wherein the current collector is carbon paper, and the amount of the lithium metal deposited on the current collector is 5 mAh/cm$^2$; using the lithium iron phosphate as the battery cathode; the high molecular polymer is added into the ester electrolyte as an additive, and the addition amount of the high molecular polymer is 2 wt % of that of the ester electrolyte.

The mentioned process of depositing lithium metal on the current collector includes the following steps: first assembling a half-cell with the cathode being the carbon paper and the anode being a lithium sheet; and depositing a predetermined amount of lithium metal on the carbon paper under a predetermined current density in a predetermined time; and then disassembling the current collector with the deposited lithium to act as the anode of the lithium battery.

The mentioned ester electrolyte is a 1.2 mol/L LiPF$_6$ solution, the solvent thereof is dimethyl carbonate (DMC), and the LiPF$_6$ solution also contains 7% fluoroethylene carbonate (FEC) by mass.

The above-mentioned high molecular polymer is prepared by polymerization reaction of monomer A being triphenylacrylonitrile, monomer B being (meth)acrylic acid perfluoroamide ester and monomer C being tripropylene glycol diacrylate. The polymerization reaction step includes: under the protection of inert gas, dispersing monomer A, monomer B, and monomer C in water with a molar ratio of 1:1:2, heating to 80° C. and stirring for 15 minutes, and then adding the initiator potassium persulfate (KPS), performing the polymerization reaction at 80° C. for 24 hours to obtain a polymerization solution; wherein the mass ratio of the initiator potassium persulfate (KPS) to the monomer C is 0.01:1; drying the polymerization solution to obtain the target polymer.

Example 1

According to an example of the lithium metal anode protection method for improving lithium utilization efficiency provided in Embodiment 1, this example provides a half-cell, and performs charge-discharge and CV (cyclic voltammetry) tests with and without adding the electrolyte additive of the present invention to test the influence of electrolyte additives on the coulombic efficiency of the half-cell.

Setting up a half-cell with carbon paper as the cathode and lithium sheet as the anode. First, depositing a certain amount of lithium on the surface of the carbon paper by constant current discharge, and then charging to 1V at a predetermined current value to dissolve the lithium deposited on the carbon paper. The ratio of the amount of stripped lithium to the amount of deposited lithium is regarded as the coulombic efficiency. The higher the coulombic efficiency, the higher the recycling utilization rate of lithium, and the more stable it can also indicate the stability of the SEI film. From the open circuit voltage test at a sweep speed of 50 mV/s, the battery with electrolyte additives does not produce a new signal peak of electrolyte component decomposition, which proves that it will not decompose under the battery test environment.

As shown in FIG. 1, through the CV test curve, it is known that adding the polymer of the present invention as an electrolyte additive, compared with the electrolyte without polymer, the potential of lithium overpotential deposition has a negative shift, indicating that the additives of the electrolyte played a role in inhibiting the deposition of lithium. And the CV curve does not produce a new signal peak of the decomposition of electrolyte components, which proves that the electrolyte additives would not decompose in the battery test environment. The overpotential of lithium deposition is inversely proportional to the size of lithium nuclei. Therefore, the addition of electrolyte additives makes lithium deposition smaller and more uniform, thereby slowing the formation of lithium dendrites.

Figure 2:
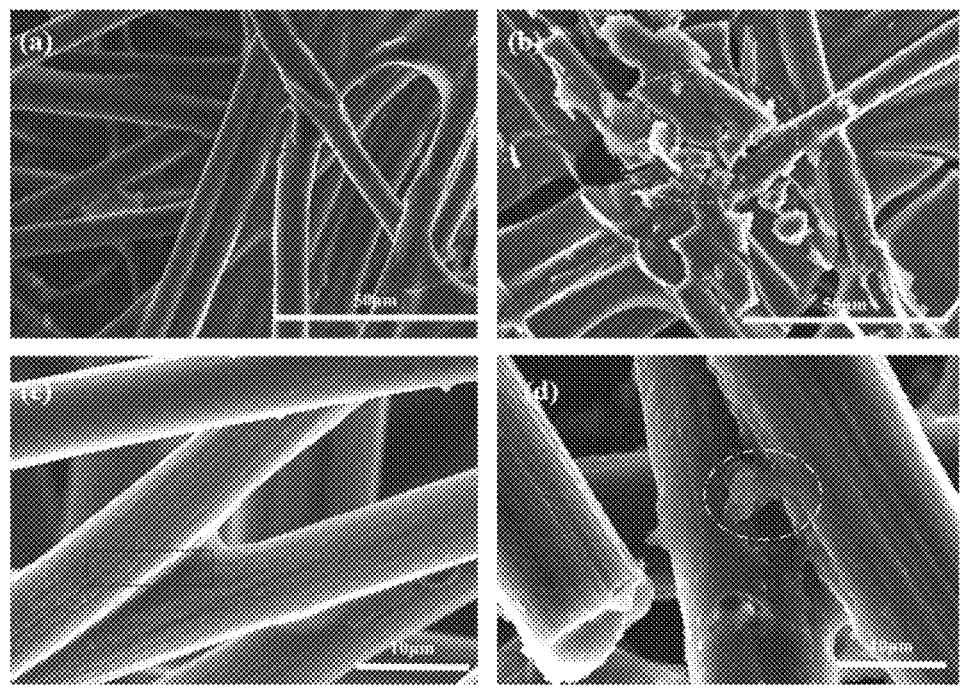
FIG. 2 is an SEM image of lithium deposited on the surface of carbon paper with and without electrolyte additives.

As shown in FIG. 2, FIG. 2(a) and FIG. 2(c) are SEM images of lithium metal deposited on carbon paper with electrolyte additives, and FIG. 2(b) and FIG. 2(d) are SEM images lithium metal deposited on carbon paper without electrolyte additives. Through SEM characterization, it is found that electrolyte additives help lithium deposition to be more uniform, facilitate the refinement of lithium nuclei, and improve the recycling rate of lithium.

Example 2

Copper foil and carbon paper are used as current collectors respectively, and lithium sheet is used as anodes to test the coulombic efficiency of half-cells. The test conditions are set to lithium deposition amount of 1 mAh/cm$^2$ and current density of 0.5 mA/cm$^2$. The results proves the dual effect of the carbon paper and electrolyte additives. The coulombic efficiency of the electrode deposited on carbon paper is more significantly improved, as shown in FIG. 3 and FIG. 4.

Figure 3:
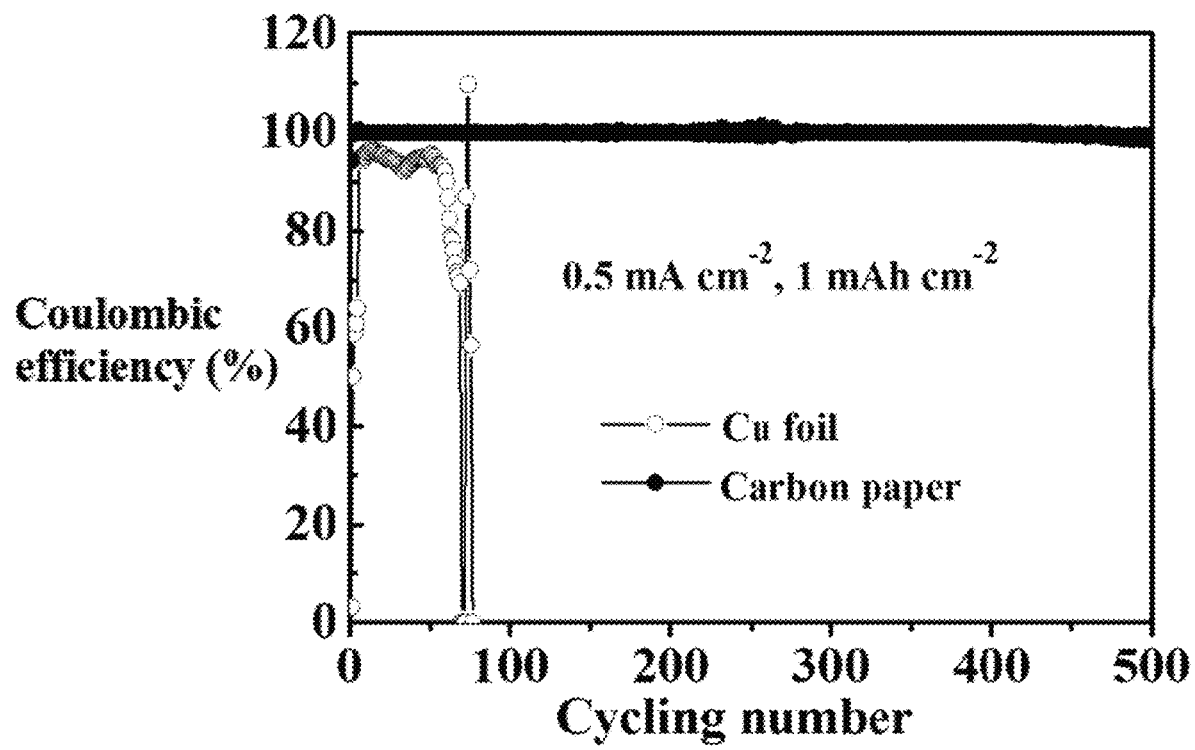
FIG. 3 is a half-cell test, with the addition of 2% electrolyte additives, the current collectors are copper foil and carbon paper respectively.

FIG. 3 shows the comparison of the circulating coulombic efficiency of carbon paper and copper foil as the current collector with the addition of 2 wt % electrolyte additives. It can be seen from FIG. 3 that the carbon paper as the current collector is capable of stably circulating for 500 cycles, the average coulombic efficiency can reach 99.87%, which is significantly better than the coulombic efficiency of copper foil as the current collector.

Figure 4:
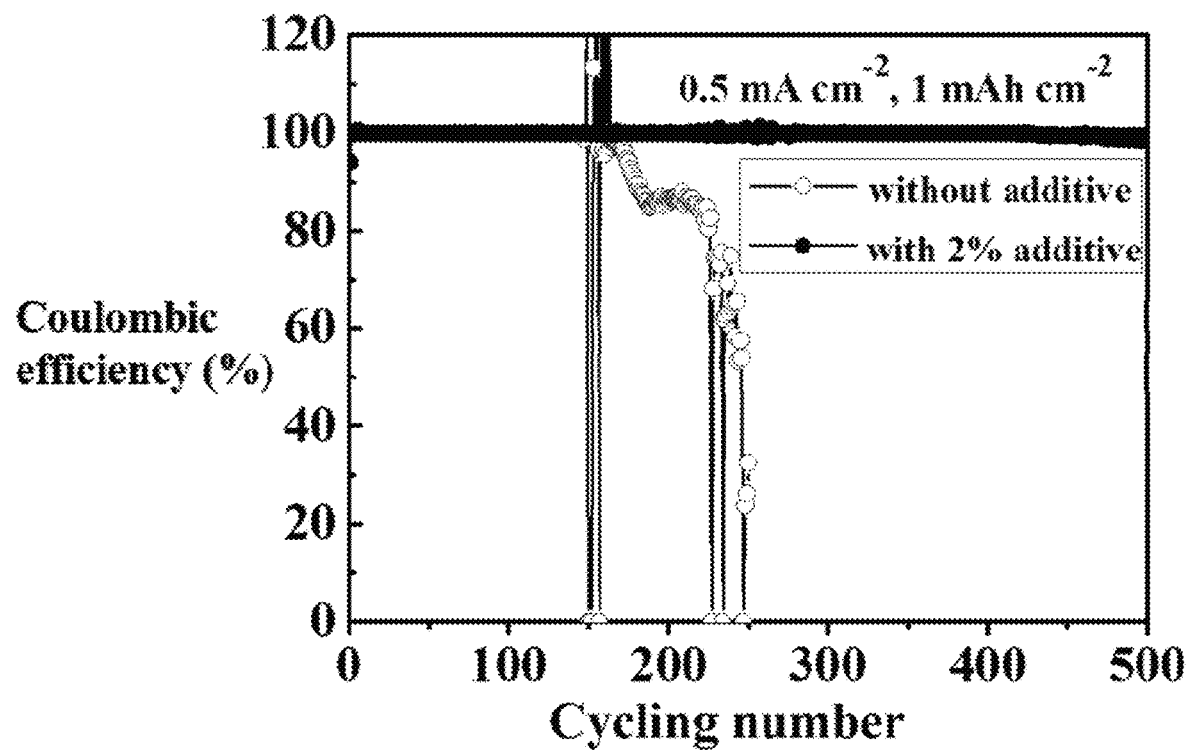
FIG. 4 shows a coulombic efficiency comparison in a half-cell test, using carbon paper as the current collector, with and without electrolyte additives.

FIG. 4 shows the comparison of the circulating coulombic efficiency of carbon paper with and without electrolyte additives. It can be seen from FIG. 4 that in the presence of 2% electrolyte additives, the half-cell coulombic efficiency is higher, which is capable of stably circulating for 500 cycles, and the average coulombic efficiency can reach 99.87%.

Figure 5:
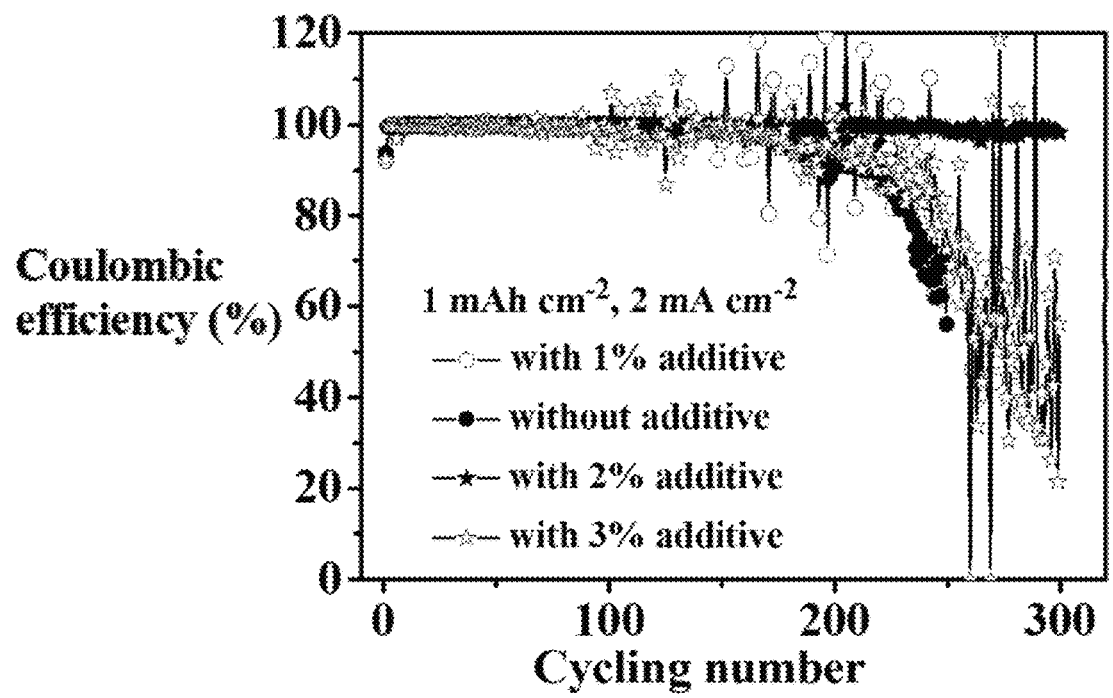
FIG. 5 shows a comparison diagram of the cyclic coulombic efficiency of the half-cell, using carbon paper as the current collector, with different amount of electrolyte additives added.

This example also compares the amount of electrolyte additives, and the results show that the addition of 2% electrolyte additive is more conducive to the improvement of coulombic efficiency and the long-term stable cycle of the battery, as shown in FIG. 5.

The present invention uses a small amount of lithium metal deposited on carbon paper as the anode, and adds the polymer of the present invention to the ester electrolyte, matching with lithium iron phosphate to make a full battery that shows better cycle performance and improves lithium utilization efficiency.

Example 3

Figure 6:
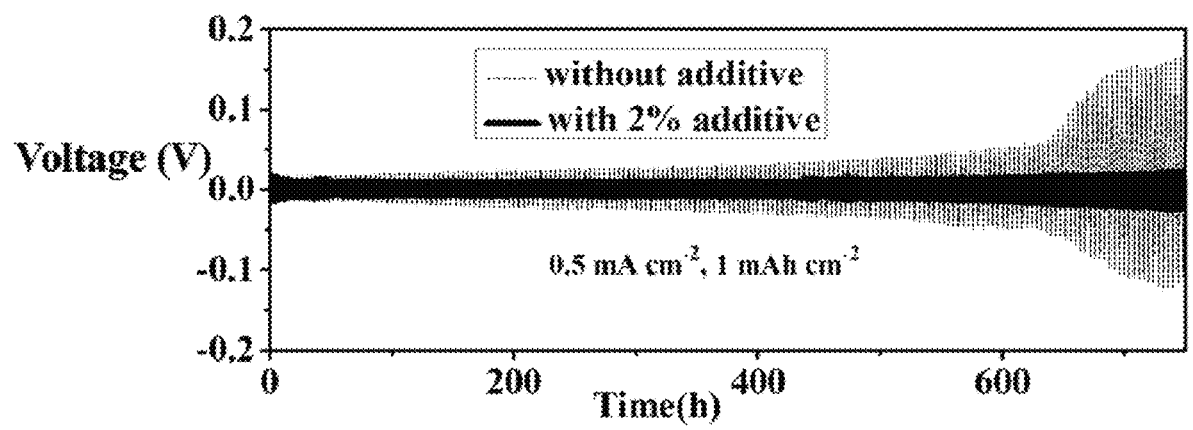
FIG. 6 shows a comparison diagram of the polarization voltage cycle performance of a symmetric battery with or without electrolyte additives, using lithium deposited on carbon paper as an electrode.

The lithium deposition amount on the current collector carbon paper is 4 mAh/cm$^2$, and two sets of symmetrical batteries are assembled to test the cycle performance, as shown in FIG. 6, at 1 mAh/cm² (lithium deposition amount) and 0.5 mA/cm² (current density). Under the conditions, the symmetric battery with 2% electrolyte additive is capable of circulating stably for more than 700 hours; the symmetric battery without electrolyte additive has a significant increase in polarization voltage after cycling, indicating that the lithium ion transmission resistance increases, and the SEI film formed is not conducive to improving the stability of the battery.

Example 4

Taking the full battery prepared in Embodiment 1, that is, the anode with 0.6 mAh/cm² lithium deposited on the current collector of carbon paper, and the polymer is added as an additive to the ester electrolyte. The addition of polymer is 2 wt % of that of the ester electrolyte, and the battery is assembled with lithium iron phosphate to test performance thereof.

Figure 7:
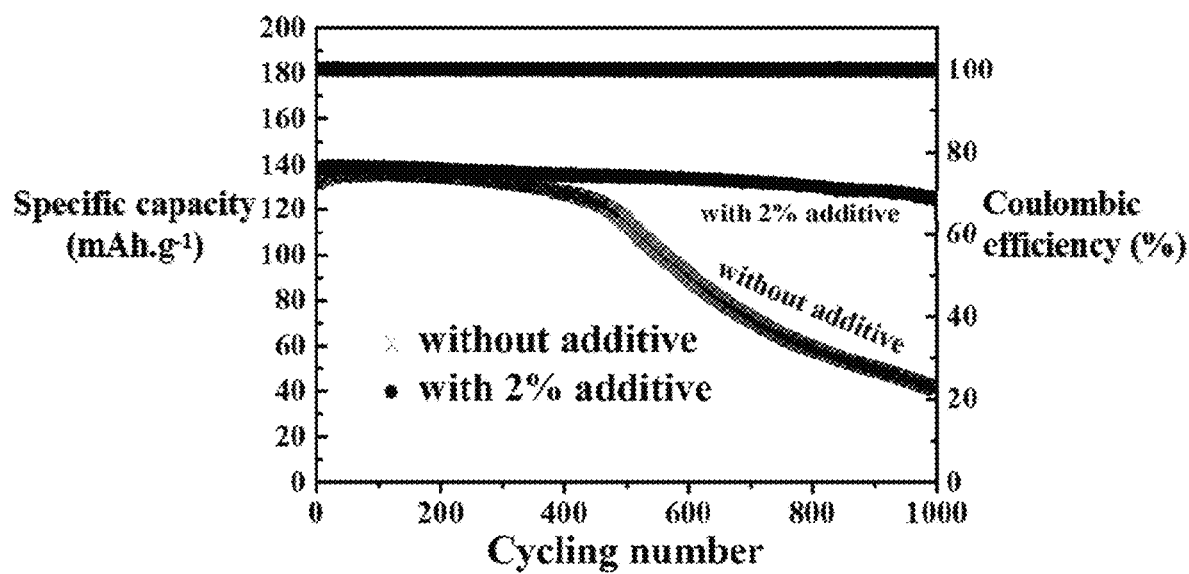
FIG. 7 shows a specific cycle mass capacity and coulombic efficiency comparison chart in a full battery test, with lithium deposited on carbon paper as the anode, with or without electrolyte additives.

As shown in FIG. 7, there are two ordinates, the left one being the mass specific capacity, and the right one being the Coulomb efficiency. The capacity retention ratio being the ratio of the mass specific capacity after a certain number of cycles to the initial mass specific capacity.

As shown in FIG. 7, under the test conditions of 1 C rate, the full battery of the present invention is capable of circulating stably for 1000 cycles, and the capacity retention rate is 90.54%. The control group does not add electrolyte additives, and the other conditions being the same as in Embodiment 1. The battery capacity retention rate of the control group is only 30.98% after 1000 cycles. It shows that adding the polymer of the present invention to the electrolyte of the present invention can protect the lithium metal anode, reduce the side reaction of active lithium and the electrolyte, and can effectively improve the capacity retention rate of the lithium battery, therefore improves the lithium utilization efficiency and makes the lithium battery long lasting.

In the above embodiment, the high molecular polymer is macromolecular substances with a relative molecular mass of 50000-2000000.

The above embodiments/examples are only used to illustrate the technical solutions of the present invention, not to limit the scope of protection of the present invention. Based on the embodiments of the present invention, those of ordinary skill in the art modify or equivalently replace the technical solutions of the present invention. Departing from the spirit and scope of the present invention, all belong to the scope of the present invention.

What is claimed is:

1. A lithium metal anode protection method, comprising steps:
   depositing lithium metal on a current collector to act as an anode of the lithium battery, and
   adding a high molecular polymer configured as an additive to an ester electrolyte;
   wherein the high molecular polymer being prepared by a polymerization reaction of monomer A being acrylonitrile or derivatives thereof, monomer B being perfluoroalkyl ethyl methacrylate or derivatives thereof, and monomer C being alkyl alcohol diacrylate or derivatives thereof;
   wherein steps of preparing the high molecular polymer from monomer A, monomer B and monomer C through polymerization reaction comprises:
   under the protection of inert gas, dispersing monomer A, monomer B, and monomer C in water with a molar ratio of 1:1:0.01-2;
   heating the water to 50-80° C. and stirring for 5-15 minutes; and then adding an initiator potassium persulfate; and
   performing the polymerization reaction at 50-80° C. for 5-24 hours to obtain a polymerization solution;
   wherein a mass ratio of the initiator potassium persulfate to the monomer C is 0.01-0.2:1; drying the polymerization solution to obtain the high molecular polymer.

2. The lithium metal anode protection method according to claim 1, wherein the current collector is carbon paper.

3. The lithium metal anode protection method according to claim 1, wherein in the lithium battery, the positive electrode a cathode of the lithium battery is lithium iron phosphate.

4. The lithium metal anode protection method according to claim 1, wherein an addition amount of the high molecular polymer is 2 wt % of that of the ester electrolyte.

5. The lithium metal anode protection method according to claim 1, wherein the ester electrolyte is a 0.8~1.2 mol/L $LiPF_6$ solution, wherein the solvent is selected from ethylene carbonate, ethyl methyl carbonate and dimethyl carbonate, and the $LiPF_6$ solution contains fluoroethylene carbonate with a mass ratio of 3 to 7%.

6. The lithium metal anode protection method according to claim 1, wherein the monomer A is selected from acrylonitrile, 2-(4-arylthiazol-2-yl)acrylonitrile, triphenylacrylonitrile, bisbenzimidazole acrylonitrile and 3-indole-2-benzimidazole acrylonitrile.

7. The lithium metal anode protection method according to claim 1, wherein the monomer B is selected from perfluoroalkylethyl methacrylate, (meth)acrylic acid fluorine-containing alkyl ester, (meth)acrylic acid heteroatom-containing perfluoroalkyl ester, (meth)acrylic acid perfluoroamide and (meth) perfluorosulfonamide acrylate.

8. The lithium metal anode protection method according to claim 1, wherein the monomer C is one selected from the group consisting of diethylene glycol diacrylate, 1,4-butanediol diacrylate, 1,6-hexanediol diacrylate, tripropylene glycol diacrylate, and neopentyl glycol diacrylate.

9. The lithium metal anode protection method according to claim 1, wherein the step of depositing the lithium metal on the current collector to act as the anode of the lithium battery comprises:
   assembling a half-cell where a cathode of the half-cell is a current collector and an anode of the half-cell is a lithium sheet;
   depositing a predetermined amount of the lithium metal on the current collector under a predetermined current density in a predetermined time; and
   disassembling the current collector deposited with the lithium metal from the half-cell and acting the current collector deposited with the lithium metal as the anode of the lithium battery.

* * * * *